Dec. 16, 1941. G. H. HUFFERD ET AL 2,266,042
HINGE AND ROLLER CONSTRUCTION
Filed Sept. 9, 1940
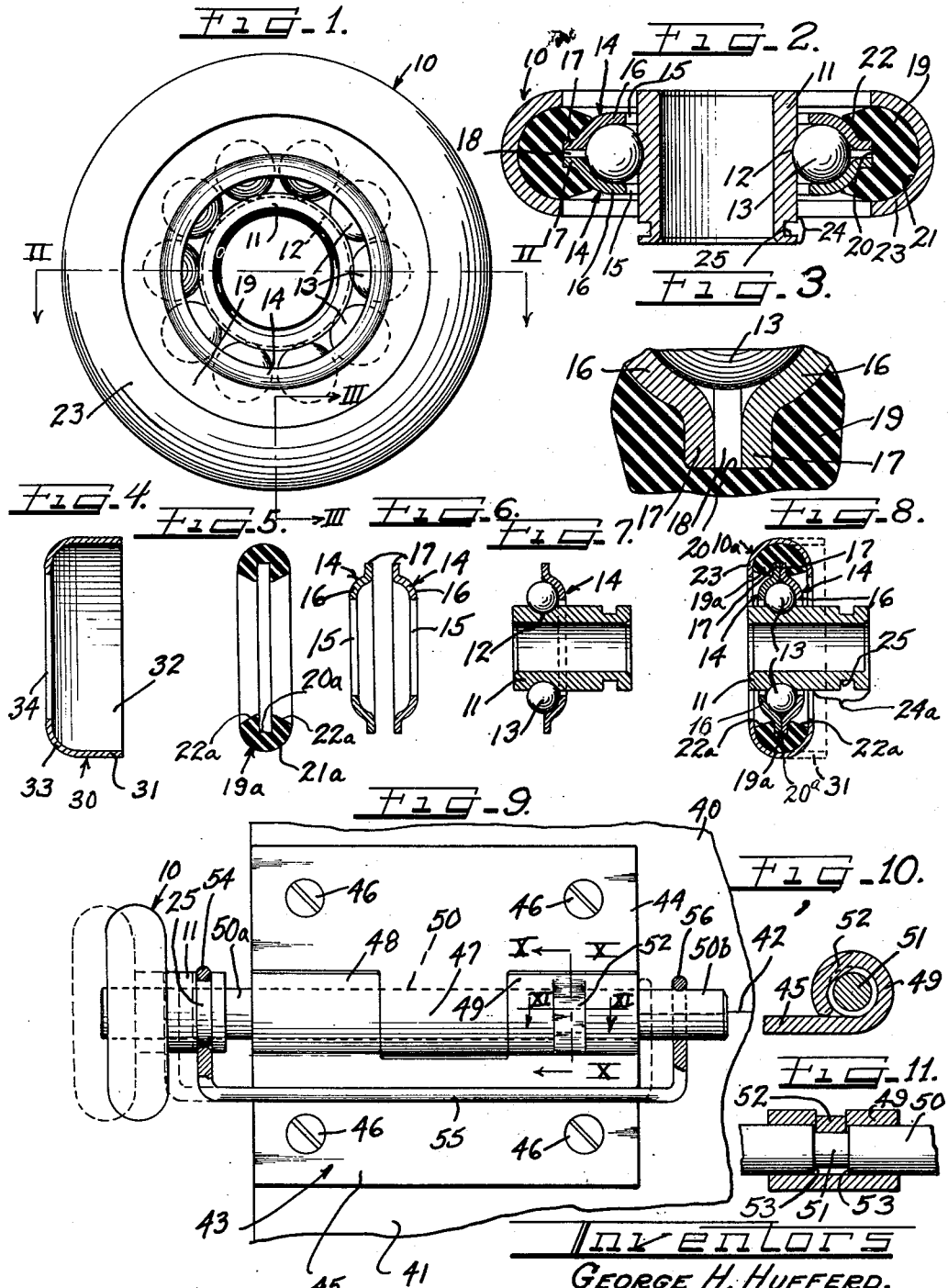
Inventors
GEORGE H. HUFFERD.
MATTHEW P. GRAHAM.
by Charles M. Mills
Attys Patented Dec. 16, 1941

2,266,042

UNITED STATES PATENT OFFICE 2,266,042

HINGE AND ROLLER CONSTRUCTION

George H. Hufferd and Matthew P. Graham, Detroit, Mich., assignors to Crawford Door Company, Detroit, Mich., a corporation of Michigan Application September 9, 1940, Serial No. 355,906

6 Claims. (Cl. 16—137)

This invention relates to a roller and hinge construction especially adapted for mounting upward acting garage doors of the sectional type.

More particularly, this invention relates to a flexible roller and hinge construction wherein the pintle pin of the hinge serves as a support for the roller and wherein the pintle pin also carries a shiftable retainer for the roller.

While the invention will hereinafter be specifically described as adapted for use in the mounting of upward acting garage doors of the sectional type, it should be understood that the roller and hinge construction is useful for many other purposes and that the rollers can be used wherever ball bearing wheels or flexible ball bearing roller constructions are desirable.

According to this invention a hub member is provided with a circumferential groove to form an inner race ring for a row of ball bearings. A pair of opposed metal rings house the ball bearings and provide an outer race ring. A resilient body member of rubber or other resilient material partially envelops the metal rings housing the ball bearings to hold the same in assembled position. A metal tire surrounds the rubber body member to provide a tread for the roller. The metal tire preferably has a segmental circular cross section to envelop the sides of the rubber body member, thereby partially encasing the rubber and pressing the same to insure the automatic wear take up of the outer race ring parts.

The rollers of this invention are readily assembled from inexpensive constituent parts and the hub members preferably have an additional circumferential groove to cooperate with a retainer for holding the hub on the pintle of a hinge while at the same time permitting limited longitudinal shifting of the hub on the pintle.

It is, then, an object of this invention to provide a roller and hinge construction wherein the pintle pin of the hinge serves as an axle for the roller and wherein the roller can shift for a limited distance on the pintle pin.

Another object of this invention is to provide a roller and hinge construction wherein the hinge carries a roller in shiftable relation thereto and wherein the roller can be distorted to follow paths not evenly aligned with the hinge.

A specific object of the invention is to provide a roller and hinge construction adapted for upward acting doors of the sectional type wherein the pintle pin of the hinge slidably carries the hub of a roller which is distortable out of alignment with the hub and wherein the pintle also carries a shiftable retainer means to limit shifting movement of the hub.

Other and further objects of the invention will be obvious from the following description of the annexed sheet of drawings which, by way of example, illustrates preferred embodiments of the invention.

On the drawing:

Figure 1 is a side elevational view of a wheel or roller according to this invention.

Figure 2 is a horizontal cross-sectional view, with parts in elevation, taken along the line II—II of Figure 1.

Figure 3 is an enlarged fragmentary vertical cross-sectional view taken along the line III—III of Figure 1.

Figure 4 is a vertical cross-sectional view taken through a metal cup member used to form the tire or tread of rollers according to this invention.

Figure 5 is a vertical cross-sectional view of a rubber bushing used to form the body part of the rollers of this invention.

Figure 6 is a vertical cross-sectional view taken through a pair of mated stamped sheet metal members used to provide an outer race ring for the rollers of this invention.

Figure 7 is a vertical cross-sectional view, with parts in elevation, showing the assembly of a row of balls in one of the members shown in Figure 6 disposed around a hub of the rollers of this invention.

Figure 8 is a vertical cross-sectional view taken through a roller built up from the parts illustrated in Figures 4 to 7 and showing in dotted lines the manner in which the tire cup of Figure 4 is bent around the bushing of Figure 5 to complete the tire and encase the bushing.

Figure 9 is a plan view of a roller and hinge construction according to this invention with parts broken away and shown in vertical cross section.

Figure 10 is a cross-sectional view taken along the line X—X of Figure 9.

Figure 11 is a vertical cross-sectional view taken along the line XI—XI of Figure 9.

As shown on the drawing:

In Figures 1 and 2 the reference numeral 10 designates generally one form of roller according to this invention. The roller 10 is composed of a cylindrical metal hub 11 having a circumferential groove 12 therearound receiving a row of balls 13.

A pair of mating stamped metal disks 14 are centrally apertured as at 15. The apertures 15 are larger than the external diameter of the hub 11 so that the disks 14 will be in spaced relation from the hub.

Each member 14 has a dished side wall 16 of segmental spherical contour extending from the aperture 15 to an outturned flat flange or rim 17.

The members 14 can be readily stamped from sheet metal by a simple stamping and punching operation which cuts circular disks from the sheet, holds the rims of the disks, cuts out the apertures 15 and presses the side walls 16 into the dished shape.

The metal members 14 are disposed in opposed relation around the row of balls 13 and form a housing or outer race ring for the balls. The side walls 16 of the members 14 are sized so that when they bear against the balls 13, the flanges or rims 17 will be in spaced opposed relation with a gap 18 therebetween as best shown in Figure 3.

A ring 19 of rubber or other resilient material is molded with an internal groove 20, a semi-cylindrical outer periphery 21 and curved or dished inner walls 22 on each side of the groove 20. The rubber ring 19 is disposed over the members 14 with the flanges 17 of the members seated in the groove 20 of the ring.

The rubber ring 19 forms the body part of the roller.

A metal tire or tread member 23 is disposed around the semi-circular periphery 21 of the ring 19 and houses the ring. The tire 23 is held by the ring 19 in spaced relation from the hub 11 and the ring 19 only partially covers the members 14 as best shown in Figure 2.

The tire 23, by virtue of its semi-circular cross section, urges the rubber inwardly to close the groove 20 thereby maintaining the members 14 in proper bearing relation with the row of balls 13. This action constantly tends to close the gap 18 between the flanges 17 of the outer race ring part and provides an effective automatic wear take-up to compensate for wear developed during movement of the anti-friction elements on their metal bearing surfaces.

The ring 19 can, if desired, be formed from a cylindrical rubber tube or sleeve deformed by the tire 23 into the desired shape for exerting a pressure tending to close the gap 18 between the race ring parts.

The hub 11 is preferably longer than the width of the tire 23 and the groove 12 in the hub is formed closer to one end than to the other for holding the hub 11 substantially flush with one edge of the tire and for projecting the hub as at 24 beyond the other face of the tire. The projecting portion 24 has a circumferential groove 25 cut therein for a purpose to be hereinafter described.

The rubber ring 19 provides a resilient body member between the metal tire 23 and the hub 11 permitting flexing of the tire relative to the hub so that the roller 10 can be deformed upon application of side forces on the tire without stressing the metal parts or causing a binding action on the anti-friction rollers. For example, if the tire 23 rides in the track of an upward acting door and this track is misaligned with the door, the tire can maintain full contact with the track in a distorted position without binding the anti-friction elements or causing excessive wear on the door mounting for the hub 11. The rubber ring 19 thus affords a flexible body for the roller construction and, in addition, provides an automatic wear take-up on the bearing parts.

The roller 10a illustrated in Figure 8 differs from the roller 10 illustrated in Figures 1 and 2 in that the rubber body member 19a does not provide an automatic wear take-up for the race ring members 14. In this modification the rubber ring 19 holdes the flanges 17 of the members 14 in contacting engagement. The ring 19a has a somewhat narrower groove 20a than the groove 20 and, in addition, has inner walls 22a on each side of the groove in spaced relation from the curved side walls 16 of the ring parts.

The balls 13 in the roller 10a can be smaller than the balls in the roller 10 so as to permit full contacting relation between the flanges 17 of the members 14 or the curved side walls 16 of the members can be sized to fit around balls of the same diameter as in the roller 10 while, at the same time, permitting engagement between their flanges 17.

The hub 11 of the roller 10a can have one end thereof flush with one side of the tire 23 as in Figures 1 and 2 while the other end can project from the other face of the tire for a distance 24a substantially greater than the distance 24 illustrated in Figure 2.

The rollers of this invention are readily assembled as indicated in Figures 4 to 7 which illustrate the assembly of the roll 10a.

In Figure 4 a stamped metal cup member 30 has a flat cylindrical side wall 31 defining an opening 32 large enough to slip the member 30 over the rubber ring 19a. The side wall 31 is inturned as at 33 to provide a curved end wall having the contour of the external periphery of the bearing ring 19a and providing a reduced opening 34 materially smaller than the diameter of the ring 19a.

The ring 19a is molded as shown in Figure 5 to provide the internal groove 20a, the internal side walls 22a and the external wall 21a of semi-cylindrical cross section.

The race ring parts 14 shown in Figure 6 are stamped from sheet metal as described above.

One of the members 14 is slipped over the hub 11 as shown in Figure 7, a row of balls 13 is mounted in the member 14, and the member 14 is positioned so that the balls will be seated in the groove 12 of the hub. The other member 14 is then disposed around the balls to house the same, the rubber ring 19a is then stretched so as to seat the flanges 17 of the members 14 in the groove 20a thereof, and the cup member 30 is slipped over the rubber ring as illustrated in Figure 8. The flat cylindrical wall 31 of the member 30 is next die-pressed inwardly to complete the tire 23 so that it will have a semi-circular cross section as illustrated in Figure 8.

The roller shown in Figures 1 and 2 is made from identical parts with the rubber ring 19 shaped slightly differently from the ring 19a.

The roller 10a shown in Figure 8 has all of the advantages of the roller 10 shown in Figures 1 and 2 with the exception of the automatic wear take-up feature. However, in the roller 10a, the balls 13 can have a freer rolling action in the outer race ring parts.

In Figure 9 the reference numerals 40 and 41 designate adjoining panels or sections of a sectional type upward acting door. The panels 40 and 41 have their adjoining ends in abutting relation as at 42, but are hingedly connected by means of a hinge 43 so that the door panels can articulate relative to each other as the door moves from vertical closed position to horizontal overhead open position.

The hinge 43 comprises a plate or leaf 44 secured to the door panel 40 and a leaf 45 secured to the door panel 41 by means of screws 46 passing through apertures in the respective leaves and threaded through the inner faces of the door panels as shown.

The leaf 44 has a dependent knuckle 47 in overlapping relation to the panel 41.

The leaf 45 has a pair of dependent knuckles 48 and 49 straddling the knuckle 47 as shown and overlapping the door panel 40. The knuckles 47, 48 and 49 provide aligned cylindrical journals for a hinge pintle 50 which swivelly connects the leaves 44 and 45.

The pintle 50 extends beyond the sides of the leaves 44 and 45 as at 50a and 50b.

As best shown in Figures 10 and 11, the pintle 50 has a localized reduced diameter portion 51 intermediate its ends and seated in the knuckle 49. A portion of the knuckle 49 is cut and depressed to provide a kerf 52 abutting the shoulders 53 formed at the ends of the reduced portion 51.

In assembling the hinge leaves 44 and 45 the pin 50 is inserted through the knuckles 47, 48 and 49 and the kerf 52 of the knuckle 49 is then depressed into the reduced portion 51 of the pin for preventing longitudinal movement of the pin.

In accordance with this invention, the end portion 50a of the pin projects beyond the side edges of the panels 40 and 41 as shown and slidably receives the hub 11 of a roller 10 or 10a shown in Figures 1 to 8. The hub 11 has an easy fit on the end 50a of the pin so that it can slide on the pin.

The grooved portion 25 of the hub is disposed between the tread of the roller and the side edges of the panels 40 and 41 and receives an eye end 54 of a stiff wire 55. The wire 55 extends across the inner face of the hinge 43 and has another eye end 56 loosely disposed around the projecting portion 50b of the pin 50.

The eye ends 54 and 56 are spaced apart for a distance greater than the length of the hinge 43 and are bent at right angles to the main body of the wire 55. Thus the hub 11 can slide on the projecting end 50a of the pin 50 away from the door panels 40 and 41 until the eye 56 abuts the outer edge of the knuckle 49 as shown in dotted lines. This wire mounting 55 thus provides a shiftable retainer for holding the hub 11 on the end portion 50a of the pin 50 while at the same time permitting limited sliding movement of the hub on the pin. This movement is arrested before the hub can slide off of the end portion 50a.

The rollers of this invention are readily mounted on the hinge constructions of this invention and held in shiftable relation thereon by an inexpensive wire retaining means which is readily snapped onto the projecting ends of the pintle pins.

Of course the wire 55 could be replaced with any other type of forged or cast straddling member having eye ends with one end loosely fitted over the inner end portion of the pintle pin and with the other end thereof seated in the groove of the roller hub.

The rollers can thus slide toward and away from the edges of the door to follow the tracks even though the tracks have varying spaced relation with the door edges. The rollers, by virtue of their resilient body portions, can be deflected out of normal alignment with their supporting pins to have full riding engagement in the tracks even though the tracks are not fully aligned with the door edges.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A roller and hinge construction adapted for upward acting doors of the sectional type including a pair of mating hinge parts, a pintle pivotally connecting said parts and exposed on both sides of the parts, means for holding said pintle in fixed longitudinal relation to said hinge parts, a hubbed roller having a flexible body member rotatable around the hub and distortable out of alignment with the hub mounted on one exposed end of the pintle, shiftable means connected to the hub extending around the other exposed end of the pintle to hold the roller on the pintle while allowing longitudinal movement of the roller toward and away from the hinge parts.

2. A flexible mounting for articulated members such as sectional type upward acting doors which comprises a hinge having a pintle extending beyond both edges of the hinge, a hubbed roller having the hub thereof mounted on one exposed end of the pintle, shiftable means connected to the hub extending around the other exposed end of the pintle to hold the roller on the pintle while allowing longitudinal movement of the hub toward and away from the hinge, and a resilient roller body member between the hub and tread of the roller allowing misalignment of the tread relative to the hub whereby the articulated members can be flexibly supported from a track engaging the tread of the roller.

3. A roller and hinge construction comprising a pair of hinge leaves, a pintle pivotally connecting said leaves and projecting beyond both leaves, means holding said pintle against longitudinal movement, a hubbed roller having the hub thereof rotatably mounted on one projecting end of the pintle, a wire member having looped ends disposed over both projecting ends of the pintle with one end connected to the hub of the roller whereby said roller can shift on said pintle for a length limited by said wire.

4. A hinge and roller construction comprising a pair of hinge leaves having mating knuckle portions, a pintle extending through said knuckle portions to hingedly connect the leaves, said pintle projecting freely from said knuckles on both ends thereof, a roller having a circumferentially grooved hub slidably mounted on one exposed end of the pintle, a member bridging said hinge having eye ends disposed around the projecting ends of the pintle with one of said ends seated in the groove of said roller hub, said eye ends of the member being spaced apart for a distance greater than the distance between the outer ends of the hinge knuckles whereby said roller can shift longitudinally on said pintle from a point where the hub contacts the hinge knuckle to a point where the eye end on the opposite end of the pintle contacts the adjacent knuckle.

5. A strap hinge and roller construction comprising a pair of hinge leaves having mating knuckle portions, a pintle extending through said knuckle portions and projecting beyond the outer ends of the knuckles, said pintle having an intermediate portion of reduced diameter, a kerf pressed down from one of said knuckles into said intermediate portion of the pintle to retain the pintle in the knuckles, a hubbed roller having the hub thereof slidably mounted over one projecting end of the pintle, a U-shaped member having eyes formed on the legs thereof slidably mounted over the projecting ends of the pintle, said hub of the roller having a circumferential groove therein receiving one of said eyes, and said eyes being spaced apart for a distance greater than the distance between the outer edges of the knuckles whereby said roller can shift longitudinally on said pin for a distance limited by said eyes.

6. A mounting for articulated members such as sectional type upward acting doors which comprises a hinge having a pintle extending beyond both edges of the hinge, a hubbed roller having the hub thereof mounted on one exposed end of the pintle, and shiftable means connected to the hub extending around the other exposed end of the pintle to hold the roller on the pintle while allowing longitudinal movement of the hub toward and away from the hinge whereby the roller can shift on said pintle for a length limited by the shiftable means.

GEORGE H. HUFFERD.
MATTHEW P. GRAHAM.